Aug. 20, 1968  E. M. GALLE  3,397,928
SEAL MEANS FOR DRILL BIT BEARINGS
Filed Nov. 8, 1965  2 Sheets-Sheet 1
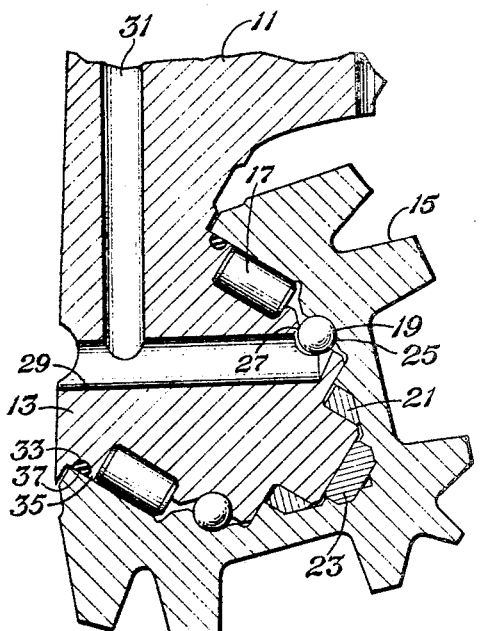
Fig. 1
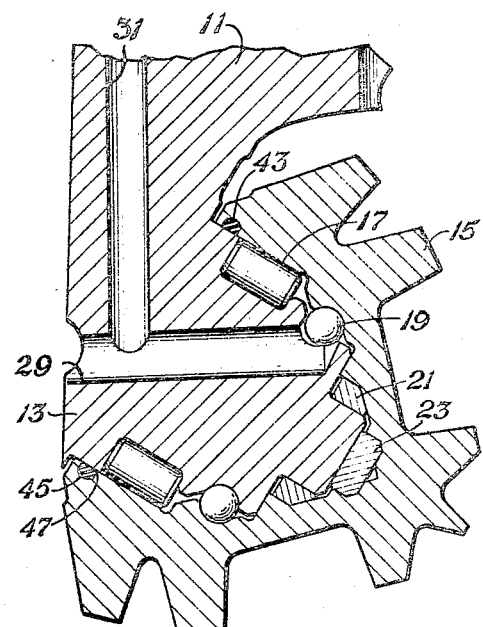
Fig. 3
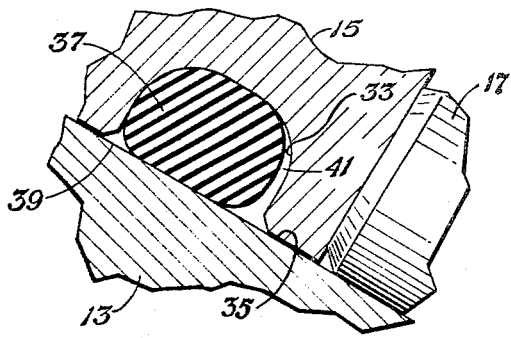
Fig. 2
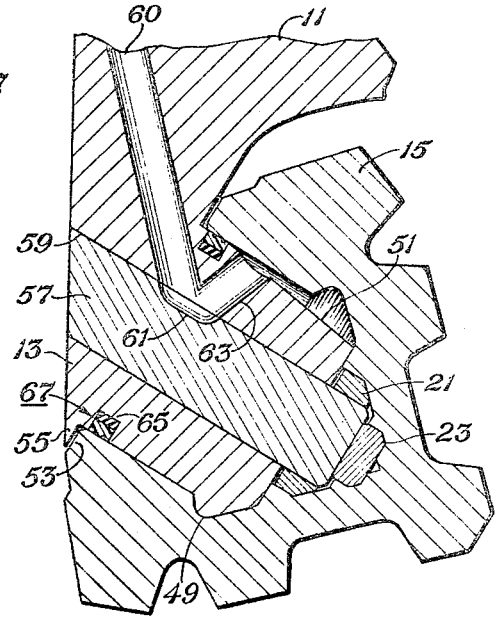
Fig. 4
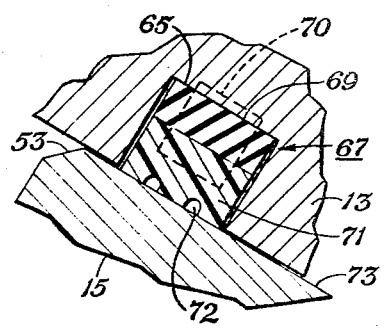
Fig. 5
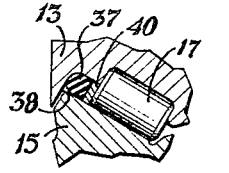
Fig. 3-A
INVENTOR
Edward M. Galle
BY
Wofford & Felsman
ATTORNEYS INVENTOR
Edward M. Galle
BY
Wofford & Felsman
ATTORNEYS United States Patent Office 3,397,928
Patented Aug. 20, 1968

3,397,928
SEAL MEANS FOR DRILL BIT BEARINGS
Edward M. Galle, 814 Elton,
Houston, Tex. 77034
Filed Nov. 8, 1965, Ser. No. 506,654
11 Claims. (Cl. 308—8.2)

My invention relates in general to improved seal means for drill bit bearings and in particular to seal means of the packing ring type.

Previously, efforts have been made to develop satisfactory seal means capable of effectively retaining a lubricant inside the rotatable cutters or cones and around the bearing surfaces of drill bits used in earth boring operations. Past efforts have been successful to the extent that drill bits which include effective seal means are now commercially available. The most effective prior art seal for drill bit bearings was patented by Atkinson et al., U.S. Patent No. 3,075,781. For reasons that will become apparent hereinafter, there exits the need for additional or improved forms of seal means for drill bit bearings.

One problem encountered when trying to originate satisfactory seal means for drill bit bearings arises due to the nature and extent of cone movement relative to the bearing shaft or pin. Cone movement is complex and includes rapid axial and radial as well as wobbling motions. Such motions generate pressure variations in the lubricant that are sensed by the seal means. Moreover, these sensed pressure variations often result in lubricant loss.

Resilient packing ring type seals, of which the "O-ring" is one popular form, are known to usually have the ability to seal effectively in the presence of pressure variations. Such seals are only recommended for use, however, where the bearings surfaces are free of sand, grit or other foreign particles, and where movements such as wobbling between the parts to be sealed is relatively small. Previous attempts to use packing ring type seals in lubricated drill bits have produced something less than satisfactory results.

In addition, small cross sectional compressions or interferences are recommended for resilient packing ring seals of the O-ring type used in rotary applications, since large interferences generate high temperatures due to increased friction. Unfortunately, small interferences for resilient packing ring type seals are not generally effective in drill bit bearings due to the large cone movements, and to the large amounts of wear that frequently result from the large forces applied to drill bit bearings. Consequently, conventional resilient packing ring seals, if applied to drill bit bearings in the conventional manner, are not satisfactory.

Preferably, the seal means for lubricated drill bit bearings should have the ability to withstand substantial pressure variations; the ability to seal effectively for long periods of time in the presence of sand or other foreign particles; and the ability to seal effectively in the face of excessive cone movement and wear.

It is accordingly the general object of my invention to provide improved seal means for drill bit bearings.

Another object of my invention is to provide resilient packing ring type seals that are effective even when sand or other foreign particles are present and in the presence of large cone movements and wear.

Another object of my invention is to increase the effectiveness of resilient packing ring type seals in drill bit bearings by altering the configuration of the bearing surfaces in the vicinity of the packing ring grooves.

These and other objects are effected by my invention as will be apparent from the following description, taken in accordance with the accompanying drawings in which:

FIG. 1 is a fragmentary side elevational view in section of a drill bit bearing shaft or pin, the associated rotatable cutter element or cone, and a packing ring assembled therewith in accordance with the principles of my invention;

FIG. 2 is an enlarged fragmentary side elevational view in section of portions of the FIG. 1 apparatus. The purpose in providing this view is to illustrate in enlarged detail a preferred embodiment of my packing ring and the associated groove structure;

FIG. 3 is a fragmentary side elevational view in section of a modified form of my invention;

FIG. 3-A is a form of my invention similar to the FIG. 1 embodiment.

Figure 6:
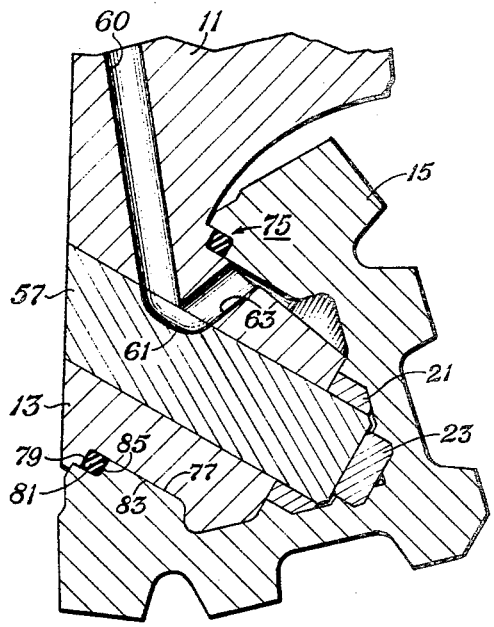
Figure 7:
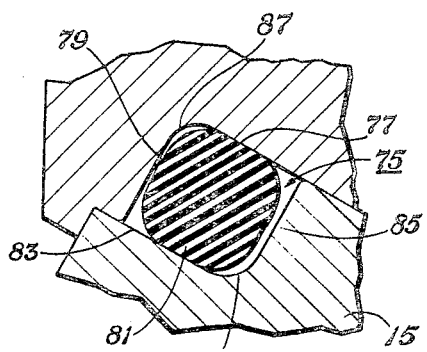
Figure 9:
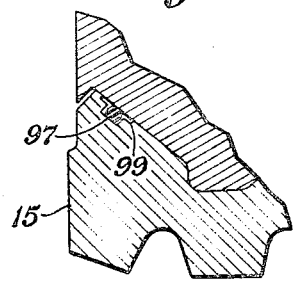
Figure 8:
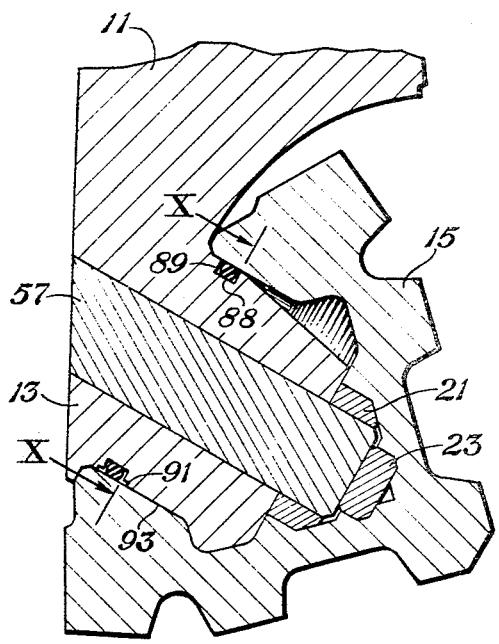
Figure 10:
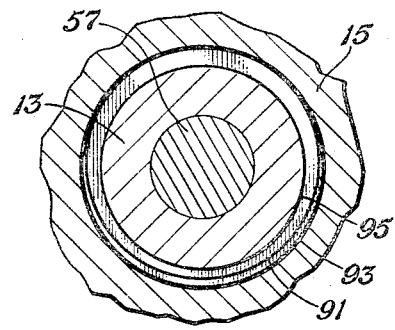

FIG. 4 is another fragmentary side elevational view in section of a third form of my invention;

FIG. 5 is an enlarged fragmentary side elevational view in section which shows in greater detail the packing ring construction of FIG. 4;

FIG. 6 is another fragmentary side elevational view in section which shows another form of my invention;

FIG. 7 is an enlarged and fragmentary side elevational view in section showing the packing ring and groove configuration of the FIG. 6 apparatus;

FIG. 8 is a fragmentary side elevational view in section of still another form of my invention;

FIG. 9 is an enlarged fragmentary side elevational view in section of seal means that relates to the FIG. 8 apparatus, but which is modified therefrom; and FIG. 10 is a cross sectional view as seen looking along the lines X—X of FIG. 8.

Referring now to FIG. 1, the numeral 11 designates the lower region of a drill bit body. A relatively stationary bearing shaft 13 is integrally secured thereto. Rotatably secured to the bearing pin 13 is a cutter element or cone 15. In this instance bearing pin 13 and the interior of cone 15 mutually engage a row of rollers 17, a row of balls 19, a bushing 21, and a thrust button 23, all of which cooperatively serve as bearing elements to support the large loads normally applied to the drill bit.

Cone 15 is retained to bearing pin 13 by means of balls 19 that are confined within the cone and bearing pin ball raceways 25, 27. During assembly of cone 15 with bearing pin 13, balls 19 are introduced to raceways 25, 27 through a ball passageway 29, which subsequently receives a plug (not shown) to retain the balls 19 in the raceways. This particular drill bit has a passage 31 that communicates at its upper end with a lubricant reservoir (not shown) and with the ball passageway 29. The plug (not shown) that is inserted in the ball passageway 29 has a configuration such that lubricant is free to flow thereby and thus to the balls 19. Clearances are provided between bearing pin 13 and the interior of cone 15 so that lubricant is distributed to the above described bearing elements. A suitable grease feeding device (not shown) is included in the drill bit so that lubricant is urged through passage 31, through ball passageway 29, and thus to the bearing elements. This grease feeding device should be of the type which substantially equalizes the pressure of the lubricant and the drilling fluid. The portions of the FIG. 1 apparatus described thus far are conventional and well known; my invention is not limited to any particular form thereof.

In the FIG. 1 drill bit, a circumferential groove 33 is formed in a cylindrical surface 35 on bearing pin 13 rearwardly of rollers 17. As may be seen in FIGS. 1 and 2, a resilient packing ring 37 is inserted in groove 33 and confined thereby such that it engages the opposing cylindrical surface 39 inside cone 15. The width of groove 33 is preferably larger than the width of packing ring 37 when compressed such that there is a slight clearance 41 left at one side of the packing ring. The packing ring 37, the bearing pin and its components, the groove 33, and the opposing surface 39 of the cone are sized such that the cross sectional thickness of the ring is compressed to not less than substantially ten percent of its cross sectional thickness when in the relaxed condition. Preferably, the compression of the cross sectional thickness of the ring is not less than substantially fifteen percent of the cross sectional thickness of the ring when in the relaxed condition. The fifteen percent interference value is more practical in anti-friction drill bit bearings of the type shown in FIGURE 1 due to the normal variation in dimensions of the bearing components and due to the normal amount of wear in such bearings during the life span of the bit. For example, if the packing ring is an O-ring having a cross sectional thickness when relaxed of .139 inch, then the amount of compression of the cross section (usually referred to as the amount of "interference") of the O-ring should be not less than substantially .014 and preferably not less than substantially .021. If the ring has, however, a cross sectional thickness of .210 inch, then it should be compressed to a value not less than substantially .021 and preferably not less than substantially .032. I prefer also that the packing rings be compressed to values not greater than about twenty percent of the relaxed cross sectional thickness, since extremely high interferences can be detrimental to the seal means.

The packing ring compressions or interferences disclosed above are significantly in excess of those recommended for rotary applications by manufacturers of packing rings of the O-ring type. Large interferences tend to increase friction and overheat packing rings, thus decreasing their life span. I have discovered, however, that such interferences may be successfully used in drill bits for reasons that will become apparent hereinafter.

Apparently, the heat generated by the above disclosed large interferences dissipates in the drilling fluid that turbulently flows around the drill bit. In addition to the surrounded drilling fluid cooling the seal directly, the drill bit construction in the area of the seal and the surrounding drilling fluid cooperate to form a heat sink or heat exchanger, which constantly cools the metal around the seals. This significantly increases the life of the seals or packing rings and permits the use of higher than ordinary rotary interferences.

Large interferences tend to increase the wear of packing rings and their mating surfaces, a phenomenon that is augmented by the presence of abrasives, such as sand, that are normally suspended in drilling fluids. If, however, the O-rings are manufactured of a resilient material, such as rubber, having a durometer hardness of not over substantially seventy (Shore A), the life span of the packing rings can be significantly increased. Preferably, the durometer hardness of the packing rings is selected from a range that varies from substantially fifty through seventy. In the past it has been recommended that higher durometer hardnesses than these be utilized in packing rings used for rotary applications. However, if softer resilient materials are used in the presence of abrasive particles, the packing rings can apparently accommodate, or form around, the individual abrasive particles and increase the life span of the packing rings and surrounding surfaces.

Thus, the utilization of the interferences disclosed above, especially when coupled with the utilization of the above durometer hardnesses produces a most effective seal means for use in drill bit bearings. Such interferences produce effective seals even after extensive wear has occurred in the bearing surfaces. By increasing the amount of interference between the packing ring and the surfaces it engages, more bearing wear can occur without rendering the seal means ineffective. In addition, increased axial and radial cone movements, as well as wobbling, can occur without the loss of seal effectiveness.

An example of manufacturing data for seal means of the type shown in FIGS. 1 and 2 that performed satisfactorily during actual well drilling operations is as follows:

A resilient packing ring constructed of butadiene acrylonitrile (Buna N) rubber with an inside diameter of 2.234±.010 inches, a mean outside diameter of 2.512 inches, and a nominal relaxed cross sectional thickness of .139±.004 inch was inserted in a circumferential rectangular groove. The packing ring was of the O-ring type, being circular in cross section. The base of the groove had a diameter of 2.468±.002 inches and had radii in the corners of .062+0, −.010 inch. The groove width was .152±.002 inch. The upper edges of the groove had slight bevels to eliminate the sharp corners. The diameter of the cylindrical surface 35 of the bearing pin was 2.660+0, −.004 inches and the inside diameter of the opposed cylindrical surface 39 of the cone was 2.690+.004, −0 inches. The diameter of the inner roller raceway of the bearing pin was 1.812+0, −.004 inches and the diameter of the rollers was .4375+.001, −0 inch. The outside diameter of the O-ring assemblied in its groove prior to assembly with a cone was measured on a number of bearing shafts. The average value of these measured diameters was 2.733 inches, which produced an O-ring compression on the pressure side of the bearing of about .023, or 16.5 percent of the O-ring thickness when in the relaxed unassembled condition (i.e. having .139 inch cross sectional diameter). The durometer hardness of the ring was 70 Shore A. Such a ring performed satisfactorily over the entire lifespan of the drill bit, being particularly effective in retaining lubricant and excluding abrasives.

With the above dimensions the O-ring is stretched when assembled in the groove such that its cross sectional diameter is reduced to about .133 inch. Although the above dimensions produced satisfactory results, I prefer that the O-ring is not stretched so greatly when assembled so that it maintains approximately the original relaxed .139 inch cross sectional thickness. Therefore, the above dimensions should be adjusted so that the packing ring is only slightly stretched and thus produces a packing ring cross sectional diameter of approximately .139 inch. Most rubber when heated in a stretched condition tends to contract, which may detrimentally effect the packing ring during operation due to increased tensile stresses. Thus, I prefer not to stretch the O-ring so greatly during assembly.

FIG. 3–A illustrates a variation of the FIG. 1 embodiment wherein O-ing 37 is inserted in a substantially L-shaped groove 38 which has a floating flange or ring 40 that separates the O-ring from the rollers. This would enable the use of a larger cross sectional diameter O-ring or enable the use of longer rollers since a thin (as measured axially) flange 40 may be used without danger of breakage. A stationary flange as shown in FIG. 1 may fragment during drilling operations if made very thin.

In FIG. 3 is illustrated a modified form of my invention that is closely related to the form illustrated in FIG. 1. The lower region 11 of the drill bit body, bearing pin 13, cone 15, rollers 17, balls 19, bushing 21, and thrust bearing 23 are all similar to those of FIG. 1. The only difference in these two forms of my invention is that the packing ring 43 of FIG. 3 is nested in a circumferential groove 45 that is formed in the cylindrical surface 47 inside the cone, instead of being assembled in a groove inside bearing pin 13. In this instance, an interference and durometer hardness are selected as disclosed above.

The packing rings can have a variety of geometries and are not limited to those that are circular in cross section. The rings may be, for example, oval shaped, somewhat squared (often referred to as quad-rings), or may have the form illustrated in FIGS. 4 and 5. FIG. 4 shows a drill bit body 11 having a bearing pin 13 formed thereon for rotatably supporting a cone 15. Bearing pin 13 has an annular lip 49 with a flattened upper region 51. The cone 15, including thrust button 23 and bushing 21, is assembled on bearing pin 13. Then a retainer pin 57 is inserted in an aperture 59, which is formed coaxially with the longitudinal axis of the bearing pin. Hence the cone 15 is locked in position on the bearing pin 13. Once again, there are a series of passages 60, 61, 63 which innerconnect a lubricant reservoir (not shown) with the various bearing surfaces.

A packing ring groove 65 is formed circumferentially around bearing pin 13 adjacent shirttail 55. A packing ring 67 is inserted into the groove 65. The particular form of packing ring shown in FIGS. 4 and 5 has an inner portion 69 formed of such material as rubber, and an outer portion 71 formed of tetrafluoroethylene resin. When inner portion 69 and outer portion 71 are mounted in groove 65 prior to assembly of the cone 15 and bearing pin 13, the radial thickness of inner portion 69 is compressed and outer portion 71 assumes a larger diameter such that their composite radial thickness is substantially greater than the depth of groove 65. Portions 69, 71 of the packing ring, groove 65, and the engaging surface 73 of the cone are sized such that the thickness of composite ring 67 is compressed upon assembly of the cone 15 upon the bearing pin 13 by at least substantially ten percent of the radial thickness of the composite ring prior to such assembly. Preferably the composite ring is compressed by at least substantially fifteen percent or greater. FIG. 5 shows the inner portion 69 in its condition when the cone is assembled with the bearing pin and also shows in phantom, numeral 70, its relaxed condition.

The outer surface of outer portion 71 of the composite packing ring 67 preferably has one or more circumferential grooves 72 to impede the flow of lubricant that may tend to flow from inside the bearing past the seal in this vicinity. It is preferable that inner and outer portions 69, 71 of the packing ring not be bonded together so that inner portion 69 can expand laterally in an unrestricted manner when compressed within groove 65.

Tetrafluoroethylene resin was selected for the construction of outer portion 71 because of its low coefficient of friction when engaged with steel. It is preferred that the outer diameter of outer portion 71 in its relaxed condition be approximately the same as that of the engaging cylindrical surface 73. The thickness of outer portion 71 does not change appreciably when assembled.

An example of manufacturing data of successfully used seal means of the type shown in FIGS. 4 and 5 are as follows:

The groove 65 was formed in a bearing pin cylindrical surface having a diameter of 2.250+0, −.002 inches. The groove was .200+.002, −0 inch wide and .178+.001, −0 inch deep. The inner portion 69 of the packing ring was formed of butadiene acrylonitrile rubber (Buna N), having a 1.859±.010 inch inner diameter, a 2.127 inch outer diameter, a thickness of .134±.004 inch and a width of .134±.004 inch in the relaxed condition, being rectangular in cross section as shown in FIG. 5. The outer portion 71 of the packing ring was formed of tetrafluoroethylene resin, having an inner diameter in the relaxed condition of 2.095+.002, −0 inches, and an outer diameter of 2.255+.002, −0 inches, a width of .195+0, −.002 inch and a thickness of .080 inch. The inside diameter of the mating surface of the cone was 2.255+.002, −0 inches. Upon assembly of the cone on the bearing shaft the composite packing ring was compressed by approximately seventeen percent from its composite cross sectional thickness when assembled in the groove prior to cone assembly.

There are a number of groove configurations which may be satisfactorily used so long as the packing ring receives cross sectional compression in accordance with the above principles. Referring now to FIGS. 6 and 7, the drill bit body 11 once again has a bearing pin 13 formed thereon to support a rotatable cone 15. The cone has inserted therein a bushing 21 and a thrust button 23 and is secured to the bearing pin by a retainer pin 57. Passages 60, 61, and 63 are provided so that lubricant can flow from a reservoir (not shown) to the various surfaces of the bearing. This drill bit and its bearings as thus far described are substantially identical with the drill bit shown in FIG. 4.

The groove means 75 shown in FIGS. 6 and 7 is different in configuration from those previously shown. From the cylindrical surface 77 on bearing pin 13 extends a radial surface 79, which is formed such that a packing ring 81 may be nested thereagainst. Cone 15 has a cylindrical surface 83 that is preferably parallel with the cylindrical surface 77 of bearing pin 13. Also, the cone has a substantially radially extending surface 85 which is preferably parallel with the radially extending surface 79 of the bearing pin. Radii 87 are formed in the corners of the grooves and the dimensins of the bearing pin and cone are selected such that the axially measured width of the groove is slightly greater than the compressed width of the packing ring 81. Successfully used packing rings of circular cross section were made of butadiene acrylonitrile (Buna N) rubber and were compressed from an original cross sectional thickness of .210±.005 inch to a cross sectional thickness of about .184 inch. Also, the durometer hardness of the ring was 70. Thus, it should be apparent that the principles of my invention may be applied to many types of grooves and that my invention is not limited to any particular type groove. For example, the packing ring of FIGS. 6 and 7 may be compressed axially instead of radially with only slight groove modification.

FIGS. 8 and 10 illustrate a modification of my invention which is advantageous. The drill bit cones and bearings are similar to those shown in FIGS. 4 and 5, including a body 11 having a bearing pin 13 formed thereon that supports a rotatable cone 15. The cone has a bushing 21 and a thrust button 53 and is secured to the bearing pin by a retainer pin 57. The bearing pin in this instance has a circumferential groove 88 formed therein which contains a packing ring 89. The packing ring and its groove are constructed in accordance with the principles explained in connection with FIGS. 1 and 2. That is, the packing ring has interference and durometer hardness in accordance with the above principles.

In this instance, however, a clearance groove 91 is formed on the pressure side of the bearing to overlie the packing ring groove (the clearance groove has a greater width than does the packing ring groove) to provide a region around the packing ring where there is no metal-to-metal contact. The construction of a preferred form of this groove may be seen in the cross sectional view of FIG. 1— where the clearance groove 91 is shown eccentrically formed with respect to bearing surface 93 of the bearing pin and with the bottom of packing ring groove 95. The purpose of this clearance groove is to reduce the heat around the seal on the pressure side of the bearing and also to remove the sharp metal corners that tend to form as the surface 93 of the bearing pin begins to wear.

FIG. 9 illustrates an alternate form of my clearance groove wherein the packing ring groove 97 is formed in cone 15 and the clearance groove 99 is also formed in the cone to overlie the packing ring groove. In this instance, as in the FIGS. 8 and 10 form of my invention, the advantages are that the heat is reduced in the region around the packing ring, since there is no metal-to-metal contact closely adjacent the packing ring. Also, the tendency for sharp metal corners to form after the bearing begins to wear is significantly decreased. The cross sectional thicknesses of the above packing rings should not be less than one and one-half percent of the drill bit diameter in which they are assembled and preferably not less than about two and one-half percent thereof. If the ring is too small, it will not have the ability to expand sufficiently to compensate for wear, tolerances and clearances.

With the above described types of packing rings a lubricant should be used which does not thicken appreciably during the life span of the drill bit.

It should be apparent from the foregoing that I have provided an invention having significant advantages. Packing ring type seal means having the above described interferences have been found effective in retaining lubricant inside drill bit bearings while excluding foreign particles such as abrasives. This is particularly true when durometer hardnesses are selected as explained above and utilized in packing rings having interferences as explained above. Such high interferences could be expected to generate heat in amounts sufficient to soon damage the packing rings. Apparently, however, the configuration of drill bits and the large volume of drilling fluid flowing therearound cooperate to form a good heat exchanger or heat sink, as mentioned previously. The temperature of the packing rings remains relatively low, enabling the packing rings to operate effectively over the life span of the drill bit.

Moreover, the durometer hardnesses specified above increase the life span and effectiveness of the packing rings. By using the hardnesses specified above, the packing rings apparently have the ability to form around the abrasive particles instead of tearing or abrading the rings. Thus, the life span of the packing rings is increased when compared to the life span of packing rings having higher hardnesses.

The use of the clearance grooves shown in FIGS. 8, 9 and 10 further increases the life span of packing rings used in drill bits. By removing the additional metal in the region of each packing ring, the heat is reduced around the packing ring on the pressure side of the bearing. In addition, the sharp metal corners which tend to form after the drill bit has been run for a period of time under the commonly used large loads are kept away from the packing rings.

While I have shown my invention in only a few of its forms, it should be apparent to those skilled in the art that it is not so limited, but is susceptible of various modifications and changes without departing from the spirit thereof.

I claim:

1. Seal means for drill bit bearings, said seal means comprising: a shaft rigidly secured to a drill bit body and having a bearing surface formed thereon; a cutter element rotatably mounted to said shaft and having a bearing surface thereon that opposes and engages the bearing surface on said shaft, one of said surfaces having a circumferential groove therein; and a resilient packing ring positioned within said groove, with said packing ring, said groove and an opposing surface being sized such that upon assembly of the cutter element upon the shaft the cross sectional thickness of said ring is compressed by not less than substantially ten percent of its thickness prior to assembly of the cutter element upon the shaft.

2. The invention as defined by claim 1 wherein said packing ring has a durometer hardness of not over substantially seventy.

3. Seal means for drill bit bearings, said seal means comprising: a shaft rigidly secured to a drill bit body and having a bearing surface formed thereon; a cutter element rotatably mounted to said shaft and having a bearing surface thereon that opposes and engages the bearing surface on said shaft, one of said surfaces having a circumferential groove therein; and a resilient packing ring positioned within said groove, with said packing ring, said groove and an opposing surface being sized such that upon assembly of the cutter element upon the shaft the cross sectional thickness of said ring is compressed by not less than substantially fifteen percent of its thickness prior to assembly of the cutter element upon the shaft.

4. The invention as defined by claim 3 wherein said packing ring has a durometer hardness of not over substantially seventy.

5. Seal means for drill bit bearings, said seal means comprising: a shaft rigidly secured to a drill bit body and having a bearing surface formed thereon; a cutter element rotatably mounted to said shaft and having a bearing surface thereon that engages the bearing surface on said shaft, one of said bearing surfaces having a circumferential packing ring groove therein; a resilient packing ring positioned within said packing ring groove; one of said surfaces having a circumferential clearance groove that has a greater width than and which overlies the packing ring groove to provide an annular region around said packing ring groove where there is no metal-to-metal contact; said packing ring having its cross sectional thickness compressed by not less than substantially ten percent of its thickness when in the relaxed condition.

6. The invention as defined by claim 5 wherein each drill bit bearing has the conventional pressure and nonpressure areas and wherein said circumferential clearance groove is formed primarily in the vicinity of the pressure area of the bearing surface of said shaft.

7. In a drill bit of the rolling cutter type having seal means to retain lubricant in the bearing area between each cutter and its supporting shaft, said bit comprising:

a lubricant reservoir connected with the bearing area between each cutter and its shaft, said reservoir being of the pressure compensating type to substantially equalize the average pressure of the lubricant and the drilling fluid;

a selected one of the cutters and the supporting shaft having groove means to receive said seal means;

said seal means being of the packing ring type and being compressed by not less than ten percent of its thickness prior to assembly between the cutter and the supporting shaft.

8. The apparatus defined in claim 7 wherein the said packing ring is an O-ring.

9. Seal means for drill bit bearings, said seal means comprising: a shaft rigidly secured to a drill bit body and having a bearing surface formed thereon; a cutter element rotatably mounted to said shaft and having a bearing surface thereon that opposes and engages the bearing surface on said shaft, one of said surfaces having a circumferential groove therein; and a resilient packing ring positioned within said groove, with said packing ring, said groove and an opposing surface being sized such that upon assembly of the cutter element upon the shaft the cross-sectional thickness of said ring is compressed by not less than substantially ten percent of its thickness prior to assembly of the cutter element upon the shaft, said packing ring having a thickness which is not less than two percent of the drill bit diameter.

10. The apparatus defined by claim 9 wherein the packing ring is an O-ring.

11. Seal means for drill bit bearings, said drill bit bearing having the conventional pressure and nonpressure areas, said seal means comprising: a shaft rigidly secured to a drill bit body and having a bearing surface formed thereon; a cutter element rotatably mounted to said shaft and having a bearing surface thereon that engages the bearing surface on said shaft, one of said bearing surfaces having a circumferential packing ring groove therein; a resilient packing ring positioned within said packing ring groove; and one of said surfaces having a circumferential clearance groove that has a greater width than and which overlies the packing ring groove to provide an annular region around said packing ring groove where there is no metal-to-metal contact, said circumferential clearance groove being formed primarily in the vicinity of the pressure area of the bearing surface of said shaft.

References Cited

UNITED STATES PATENTS

| | | | |
|---|---|---|---|
| 2,180,795 | 11/1939 | Christensen | 277—177 |
| 2,394,364 | 2/1946 | Christensen | 277—177 |
| 2,456,529 | 12/1948 | Naab | 277—165 |
| 2,676,790 | 4/1954 | Turner | 308—8.2 |
| 2,877,071 | 3/1959 | Arnot | 277—165 |
| 3,127,942 | 4/1964 | Neilson | 308—8.2 |
| 3,186,702 | 6/1965 | Taylor. | |
| 3,244,457 | 4/1966 | Ross | 308—36.1 |
| 3,261,613 | 7/1966 | Norick | 277—176 |
| 3,299,973 | 1/1967 | Swartz | 308—8.2 |
| 3,307,645 | 3/1967 | Hildebrandt. | |

FOREIGN PATENTS

| | | |
|---|---|---|
| 558,383 | 6/1958 | Canada. |
| 1,049,256 | 12/1953 | France. |
| 1,260,803 | 3/1961 | France. |

MARTIN P. SCHWADRON, *Primary Examiner.*

L. L. JOHNSON, *Assistant Examiner.*

UNITED STATES PATENT OFFICE
CERTIFICATE OF CORRECTION

Patent No. 3,397,928                                    August 20, 1968

Edward M. Galle

It is certified that error appears in the above identified patent and that said Letters Patent are hereby corrected as shown below:

In the heading to the printed specification, lines 3 and 4 "Edward M. Galle, 814 Elton, Houston, Tex. 77034" should read -- Edward M. Galle, Houston, Tex., assignor to Hughes Tool Compa Houston, Tex. --. Column 1, line 20, "exits" should read -- exists --; line 32, cancel "usually". Column 3, lines 18, 36 and 38, "to", each occurrence, should read -- by --; line 53, "surrounded" should read -- surrounding --. Column 4, line 34, "assemblied" should read -- assembled --; line 57, "effect" should read -- affect --. Column 6, line 29, "dimensins" should read -- dimensions --.

Signed and sealed this 10th day of February 1970.

(SEAL)
Attest:

EDWARD M.FLETCHER,JR.                          WILLIAM E. SCHUYLER, JR
Attesting Officer                                    Commissioner of Patents